Nov. 28, 1950          R. L. TAYLOR          2,531,654

AUTO ROAD SANDER

Filed March 22, 1949

INVENTOR.
ROBERT L. TAYLOR.
BY
David H. Eckroud
Attorney.

Patented Nov. 28, 1950

2,531,654

UNITED STATES PATENT OFFICE 2,531,654

AUTO ROAD SANDER

Robert L. Taylor, Akron, Ohio

Application March 22, 1949, Serial No. 82,895

2 Claims. (Cl. 291—28)

My invention relates to a new design and improvement in sanding devices, and especially for motor vehicles operating on roads and highways.

The primary object of the invention is to provide a practical and efficient sanding device which will operate and function at the will of the operator of a vehicle in providing sand or other similar material to be discharged in the path of the rear tires of said vehicle for the purpose of improving traction on wet or slippery surfaces.

Another object of the invention is to provide an improved means in the form of a valve for controlling the discharge of sand, or other similar material from a container conveniently located near to the point of such discharge.

Another object of the invention is to provide a device of the nature and class described in which the container is located within the luggage compartment of an auto, or motor vehicle, and conforming to the shape of such vehicle part, so that the contents of such container will not be exposed to dampness or the weather, and thus interfere with its efficiency.

Another object of the invention is to provide a sanding device that is operated from the dashboard, or other convenient location, of a motor vehicle by the driver of such vehicle, by use of a switch or other means and similar in operation to a wind shield wiper and continues to operate without further attention from the driver.

Other objects and advantages available in the use of this invention will become obvious from the description of the parts and as further shown in the accompanying drawing, in which.

Figure 1:
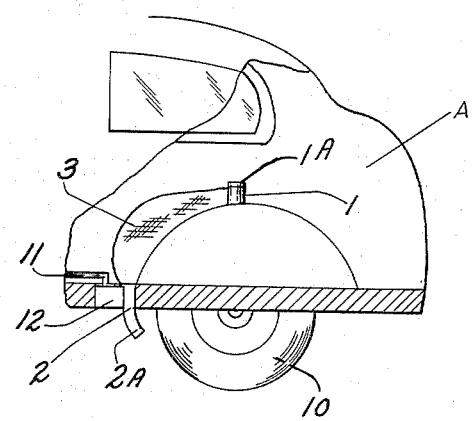
Fig. 1 is a view of the rear portion of an automobile and showing the location of the device located within the luggage space and in close proximity to a rear tire.
Figure 2:
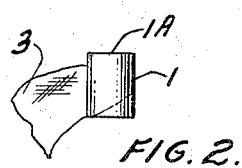
Fig. 2 is a view of a section of the container with the means for filling same.
Figure 3:
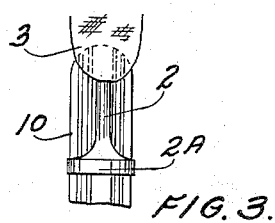
Fig. 3 shows a segment of the delivery portion of the device, being the mouth in form for spreading the contents of the device in front of an automobile tire.
Figures 4, 5:
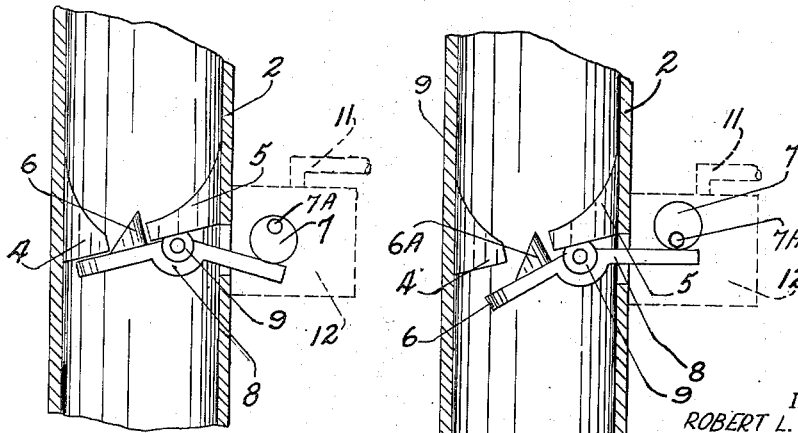
Fig. 4 shows a cross-sectional view in elevation of the lower portion of the device with a baffle and valve fixed therein and the cam that operates such valve, such valve is shown in a closed position.
Fig. 5 shows the same parts as in Fig. 4, excepting that the valve is shown in an open position.

Referring to the drawings: A is the rear section of an automobile with the device located in the baggage, or trunk compartment to prevent contact with the weather or dampness, 1 is the opening, with cover 1A, for filling the storage portion or container with sand or similar material, such container being adapted by form and shape to fit over the forward wall of the rear fender of an automobile, 2 is the delivery portion of the device with the opening, or mouth 2A, 4 and 5 are opposite sides of a "baffle" located within the portion 2, 6 is a valve having an outwardly extending arm 8 and an inwardly extending arm 6B lying in different planes, such valve being operated by the cam 7 and located and fixed within 2 by means of 9, such valve is shown closed in Fig. 4 and open in Fig. 5, the valve being opened by the weight of the material in 3 and closed by pressure of the cam 7 on the lever 8, 7A is the driving rod of the cam 7, 7 being the disk portion of the cam. The cam operating mechanism is located in the box or inclosure 12, such mechanism being operated from the motor by means of vacuum, or by a source of electric energy, similar to a windshield wiper, connecting with 12 through the casing, or tube 11, which tube connects to the panel, dash board or on any place convenient to the driver of a motor vehicle. The operator controls the use of the device by means of a switch, valve, or other means on the panel board, the device operating automatically as long as such controlling unit is functioning.

When it is desired, or necessary to operate the device, the driver of the vehicle sets the device into operation by means of a switch or other means on the panel, or dash board, or other convenient place which operates the cam mechanism in the box, or inclosure 12, as the device is thus operated the valve in 2 will be opened and closed intermittently, as stated previously, discharging the material in the container of the device and spreading it in the path of the tire or tires. The device will thus operate without any further attention from the driver until it is decided to stop such operation by means of the switch, or other controlling means.

I have shown and described my invention in a desired and useful and efficient form and structure, however, adaptations in its use may require modifications in its form or structure or both without departing from the basic features or the spirit of the invention.

I claim:

1. A sander for a vehicle, comprising a container for sand, or similar material, a delivering part in the form of an elongated hollow member extending downward from said container, said hollow member having a baffle and a valve positioned therein, the said hollow member terminating in a nozzle adapted to spread the material from said container as such material is discharged from such container, the said baffle forming an inclined seat, for said valve, said valve pivotally attached to the surface of the said hollow member, said valve having an inwardly and an outwardly extending arm lying in different planes, said outwardly extending arm positioned to contact an outside driven cam to operate the inwardly extending arm, the operation of said inward valve arm adapted to regulate the flow of material from the said container through the said nozzle for discharge therefrom.

2. A sander for vehicles, comprising the structure described in claim 1, said valve arm positioned to automatically move downward from the said valve seat by means of the weight of the material from within the said container, said valve arm to move upward and close the opening through said baffle by means of the pressure of said outward arm by said cam, the weight of the said material in conjunction with the action of the said cam causing said valve to open and close intermittently to discharge the material from said container, and said material discharged into the path of a rear tire, or tires, through and by means of said nozzle.

ROBERT L. TAYLOR.

REFERENCES CITED

The following references are of record in the file of this patent:

UNITED STATES PATENTS

| Number | Name | Date |
|---|---|---|
| 1,085,245 | Cowdrey | Jan. 27, 1914 |
| 1,575,098 | Conty | Mar. 2, 1926 |
| 1,734,276 | Skolnik et al. | Nov. 5, 1929 |
| 1,888,006 | Marryatt et al. | Nov. 15, 1932 |
| 1,955,307 | Morrison et al. | Apr. 17, 1934 |
| 2,282,185 | Havill | May 5, 1942 |

FOREIGN PATENTS

| Number | Country | Date |
|---|---|---|
| 350,779 | France | Apr. 19, 1905 |